United States Patent
Jeong et al.

(10) Patent No.: US 7,285,220 B2
(45) Date of Patent: Oct. 23, 2007

(54) WATER SOFTENER

(75) Inventors: Seung-hoon Jeong, Incheon (KR); Choong-hoon Jeong, Incheon (KR)

(73) Assignee: Seung Gwang Co., Ltd., Icheon (KR)

( * ) Notice: Subject to any disclaimer, the term of this patent is extended or adjusted under 35 U.S.C. 154(b) by 479 days.

(21) Appl. No.: 10/519,502

(22) PCT Filed: Apr. 20, 2004

(86) PCT No.: PCT/KR2004/000902

§ 371 (c)(1),
(2), (4) Date: Dec. 27, 2004

(87) PCT Pub. No.: WO2004/094035

PCT Pub. Date: Nov. 4, 2004

(65) Prior Publication Data

US 2005/0235821 A1    Oct. 27, 2005

(30) Foreign Application Priority Data

Apr. 21, 2003  (KR) .................. 10-2003-0025213
Apr. 21, 2003  (KR) .................. 10-2003-0025214

(51) Int. Cl.
*C02F 1/42* (2006.01)

(52) U.S. Cl. ............... 210/670; 210/675; 210/264; 210/269; 210/284; 210/288; 210/503; 210/190; 92/78

(58) Field of Classification Search .......... 210/670, 210/675, 264, 269, 284, 288, 503, 190; 137/268; 92/78
See application file for complete search history.

(56) References Cited

U.S. PATENT DOCUMENTS 3,385,441 A * 5/1968 Lyall .................. 210/134
6,436,293 B1 * 8/2002 Carli .................. 210/661

FOREIGN PATENT DOCUMENTS

| FR | 2069826 | * | 9/1971 |
| FR | 2283864 | * | 4/1974 |
| JP | 07204641 A | * | 8/1995 |
| JP | 2000218266 A | * | 8/2000 |

* cited by examiner

*Primary Examiner*—Krishnan S Menon
*Assistant Examiner*—Benjamin Kurtz
(74) *Attorney, Agent, or Firm*—Lowe Hauptman Ham & Berner LLP

(57) ABSTRACT

Disclosed is a water softener capable of producing soft water at various temperatures and facilitating the regeneration of an ion exchange resin thereof. The water softener includes a water softening tank in which an internal region containing therein the ion exchange resin is partitioned into a plurality of water softening regions which are individually assigned into a predetermined temperature; a regeneration tank integrated with the water softening tank into a single body and containing the regeneration material of the ion exchange resin; a cold/hot control valve to supply raw water to a selected one of the plurality of water softening regions according to the temperature of the raw water to rapidly supply the soft water at a desired temperature to a user, and a regeneration valve to facilitate the periodic regeneration of the ion exchange resin through a simple manual operation.

5 Claims, 6 Drawing Sheets

WATER SOFTENER

TECHNICAL FIELD

The present invention relates to a water softener to produce soft water using an ion exchange resin and a regeneration material of the ion exchange resin by causing raw water to pass through the ion exchange resin to produce soft water during a soft water producing process and causing a regeneration material to be dissolved in the raw water to generate regeneration water that then flows through the ion exchange resin to regenerate the ion exchange resin, and is, thereafter, discharged as resulting waste regeneration water during a regeneration process. In detail, the present invention relates to a water softener capable of producing soft water at various temperatures and facilitating the regeneration of an ion exchange resin thereof, which includes a water softening tank in which an internal region containing therein the ion exchange resin is partitioned into a plurality of water softening regions which are individually assigned into a predetermined temperature; a regeneration tank integrated with the water softening tank into a single body and containing the regeneration material of the ion exchange resin; a cold/hot control valve to supply raw water to a selected one of the plurality of water softening regions according to the temperature of the raw water to rapidly supply the soft water at a desired temperature to a user; and a regeneration valve to facilitate the periodic regeneration of the ion exchange resin and being simply manually operable.

BACKGROUND ART

Water used by humans is classified into two major types: soft water and hard water. So-called surface water, such as rainwater, and distilled water are classified as soft water to be relatively pure and have a relatively low hardness due to its composition with major components of hydrogen and oxygen. By contrast, ground water is classified as hard water to have high hardness due to its components of calcium ions ($Ca^{2+}$) and magnesium ions ($Mg^{2+}$).

Currently, tap water supplied to a home is hard water as it has a high content of positively charged ions, such as calcium and magnesium. Tap water also contains chlorine (Cl), which is used in a water cleaning process, as well as heavy metals, such as iron (Fe), copper (Cu), tin (Sn), zinc (Zn) and mercury (Hg), from polluted environments and water being transported via old pipes. These heavy metals bind to the fatty acids of soaps. For humans, the resulting products are not lethal but harmful. Further, they can stimulate skin aging and cause skin troubles, such as atopic dermatitis.

To resolve these problems, water softeners are widely used, which soften hard water, such as tap water to give high quality water by substituting calcium ions and magnesium ions contained in hard water with harmless sodium ions ($Na^+$). For this softening function, a water softener typically comprises essentially a water softening tank to soften raw water, which is filled with an ion exchange resin of a particular polymer compound with sodium ions, and a regeneration tank to regenerate the ion exchange resin in which sodium ions are reduced by continuous contact with raw hard water, which contains a regeneration material for the ion exchange resin, such as salts which release sodium ions when dissolved in water.

In detail, referring to FIG. 1 which schematically shows a conventional water softener, the conventional water softener comprises a water softening tank 2 containing an ion exchange resin and a regeneration tank 12 containing a regeneration material for the ion exchange resin. The water softening tank 2 and the regeneration tank 12 are, in upper parts thereof, equipped respectively with first and second water inflow tubes 4 and 14 to transport external raw water thereto. A water discharge tube 6 is provided to a lower part of the water softening tank 2. The water softening tank 2 is, in an upper part thereof, connected to a lower part of the regeneration tank 12 via a connection tube 16. Also, first and second control valves V1 and V2 are provided respectively on the first and second water inflow tubes 4 and 14, and third and fourth control valves V3 and V4 are provided respectively on the water discharge tube 6 and the connection tube 16. When the first control valve V1 is opened, raw water is supplied to the water softening tank 2 through the first water inflow tube 4 and is softened therein. Subsequently, when the third control valve V3 is opened, the softened water is discharged to the exterior via the water discharge tube 6.

On the other hand, when water softening is carried out for a long period, concentration of sodium ions in the ion exchange resin are diminished. Thus, the resin should be periodicly regenerated. For this resin regeneration, the first and third control valves V1 and V3 are closed, and the second control valve V2 is opened to supply raw water to the regeneration tank 12. Then, the fourth control valve V4 is opened to supply the resulting water containing salt from the regeneration tank 12 to the water softening tank 2. Thereafter, the fourth control valve V4 is closed, and the third control valve V3 is opened, to completely remove salt remaining in a free form in the water softening tank 2. The resin is again available for the production of soft water.

According to the intended use, the water softening tank 2 may be provided in the number of two. Two water softening tanks may be supplied with warm and cool raw water, respectively. To separately regenerate ion exchange resins in the two water softening tanks 2, the regeneration tank 12 may be also provided in the number of two. Korean Pat. Application Nos. 1997-003670 and 2000-0039303 disclose water softeners which are similar in the technical base to, but just slightly differ in the number of and the connection method of the water softening tank and the regeneration tank from, that described above.

However, the conventional water softeners have disadvantages, as follows. The regeneration process of ion exchange resins is time-consuming because of its complexity as it requires a lot of time, even by skilled persons. Also, the conventional water softeners are very inconvenient in use because a plurality of valves (like the V1, V2, V3 and V4 as described above) should be manually controlled by a user during the resin regeneration process. For this complex structure, the conventional water softeners easily become inoperable or are often abnormally operated, require high production costs, and are large in size, and thus, require wide areas upon installation, resulting in difficult installations at narrow places, such as bathrooms.

The disadvantages of the conventional water softeners further include that, since the temperature of the generated soft water depends on the externally supplied raw water, soft water at a desired temperature is slowly supplied to a user.

DISCLOSURE OF THE INVENTION

It is therefore an object of the present invention to provide a water softener which is capable of being manufactured in a small size, rapidly supplying soft water at a desired temperature to a user, and simply and easily performing a periodic regeneration of an ion exchange resin.

In accordance with the present invention, there is provided a water softener 100 to produce soft water at various temperatures and facilitate the regeneration of an ion exchange resin 112 thereof by forcing raw water to pass through the ion exchange resin 112 to produce soft water during a soft water producing process and causing a regeneration material 132 to be dissolved in the raw water to generate regeneration water that then flows through the ion exchange resin 112 to regenerate the ion exchange resin, and is, thereafter, discharged as resulting waste regeneration water during a regeneration process, which includes a water softening tank 110 in which an internal region containing therein the ion exchange resin 112 is partitioned into a plurality of water softening regions 110a, 110b, 110c and 110d, which are individually assigned into a predetermined temperature, with a raw water feed pipe 114 placed in a longitudinal direction of the water softening tank, a plurality of partitions 15 placed in radial directions around the raw water feed pipe 114, a water inlet hole 116 formed on a bottom of the water softening tank to extend the raw water feed pipe 114 to the exterior and supply the raw water into the water softening tank, and a plurality of water discharge holes 118 formed on the bottom of the water softening tank to allow for a communication of the plurality of water softening regions with the exterior and to discharge the soft water and the waste regeneration water to the exterior; a regeneration tank 130 coupled to an upper part of the water softening tank 110 and containing therein the regeneration material 132; a cold/hot control valve 140 provided on an upper part of the raw water feed pipe 114 in a form of being inserted into the regeneration tank 130 to supply the raw water to a selected one of the plurality of water softening regions 110a, 110b, 110c and 110d during the soft water producing process; a regeneration valve 160 penetrating an upper surface of the regeneration tank 130 and coupled to the raw water feed pipe 114 through the cold/hot control valve 140, and, upon the regeneration of the ion exchange resin, introducing the raw water into the regeneration tank 130 by manual control to produce the regeneration water, and then supplying the regeneration water to a selected one of the plurality of water softening regions 110a, 110b, 110c and 110d; a temperature sensor 190 to sense a temperature of the raw water supplied through the water inlet hole 116; and an operation control unit 200 to control the cold/hot control valve 140 to supply the raw water to one of the plurality of water softening regions 110a, 110b, 110c and 110d according to the temperature of the raw water sensed by the temperature sensor 190.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
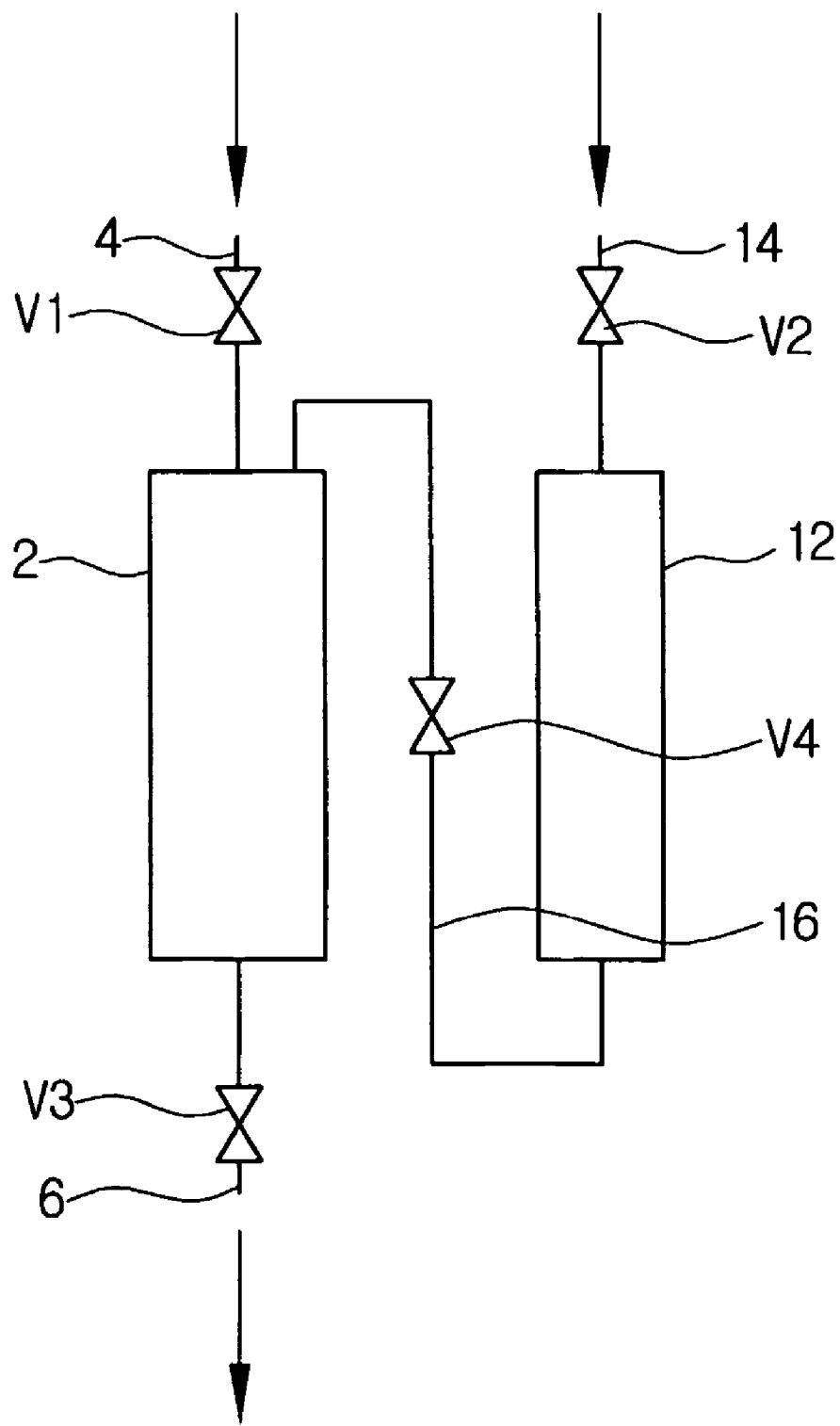
FIG. 1 is a block diagram of a conventional water softener.
Figure 2:
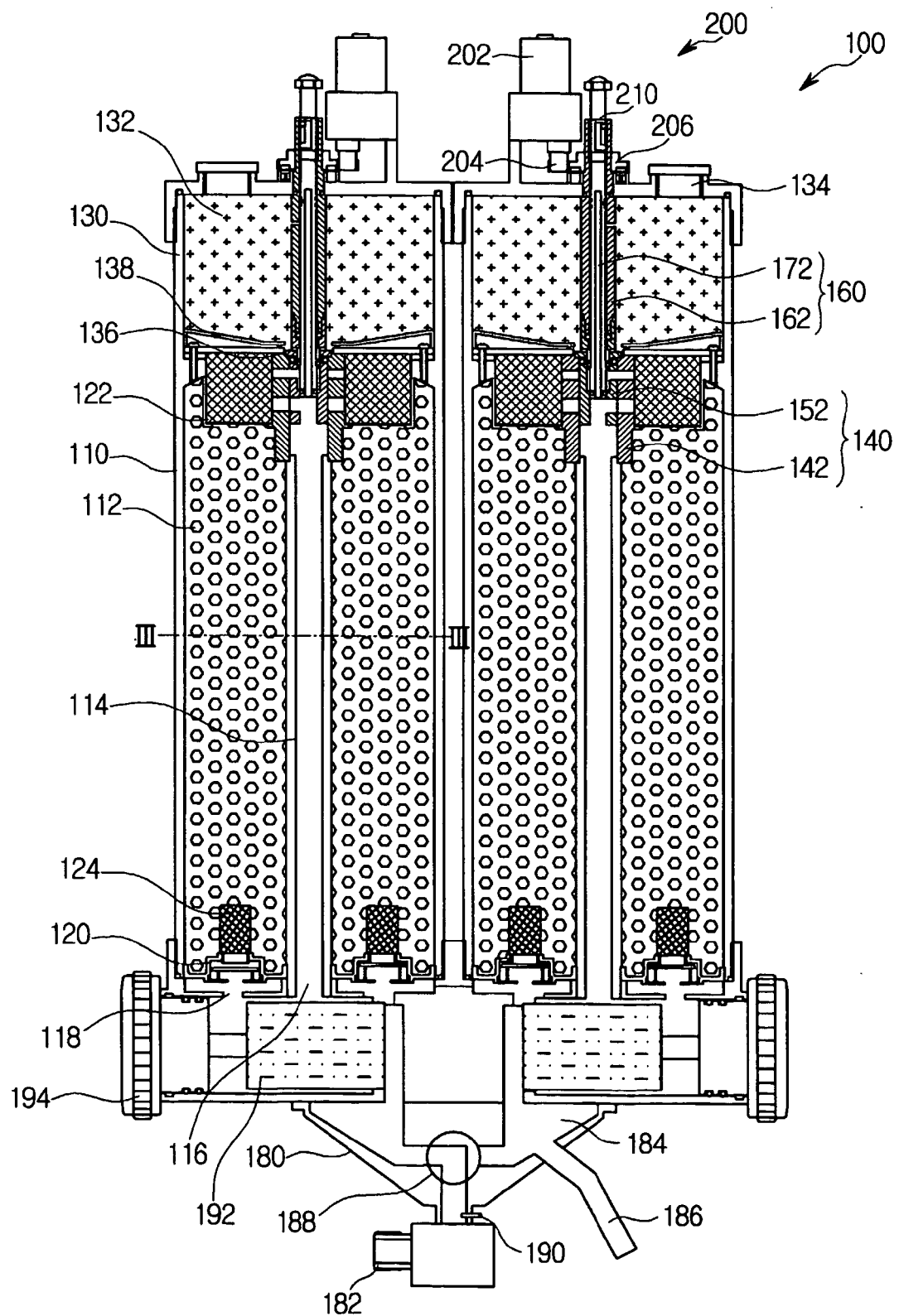
FIG. 2 is a sectional view of a water softener according to an embodiment of the present invention.

Referring to FIG. 2 which is a perspective view of a water softener 100 according to a preferred embodiment of the present invention, the water softener 100 includes essentially two major constituents: a water softening tank 110 filled with an ion exchange resin 112 of a specific polymer having sodium ions and a regeneration tank 130 containing a regeneration material 132 for the ion exchange resin, such as salts releasing sodium ions when dissolved in water.

Therefore, the water softener 100 according to the present invention produces soft water by forcing raw water to pass through the ion exchange resin 112 of the water softening tank 110 to substitute positively charged ions with the sodium ions in the raw hard water during a soft water producing process, and regenerates the ion exchange resin 112 containing a high content of the positively charged ions by continuous contact with the raw hard water by periodicly causing a regeneration material 132 of the regeneration tank 130 to be dissolved in the raw water to generate regeneration water that then flows the regeneration water through the ion exchange resin 112 during a regeneration process.

In the water softener 100 according to the present invention, the water softening tank 110 and the regeneration tank 130 are integrated into a single body where the regeneration tank 130 and the water softening tank 110 are placed respectively at upper and lower portions, and, preferably, individually include two tanks arranged side-by-side to produce cold and hot soft water, as shown in FIG. 2.

The water softening tank 110 is coupled to a base frame 180. The base frame 180 is coupled to a water tap typically installed, for example, at home or hotels, and is equipped with a water inlet tube 182 to supply the external raw water to the base frame, an internal water discharge region 184 at which soft water and waste regeneration water, discharged from the water softening tank 110, join together, and a water discharge tube 186 to extend the internal water discharge region 184 to an exterior. In particular, the base frame 180 may be equipped with a raw water control valve 188 to supply the raw water from the water inflow tube 182 to a selected one of the plurality of water softening tanks 110.

The base frame 180 will be described in detail later herein.

Figure 3:
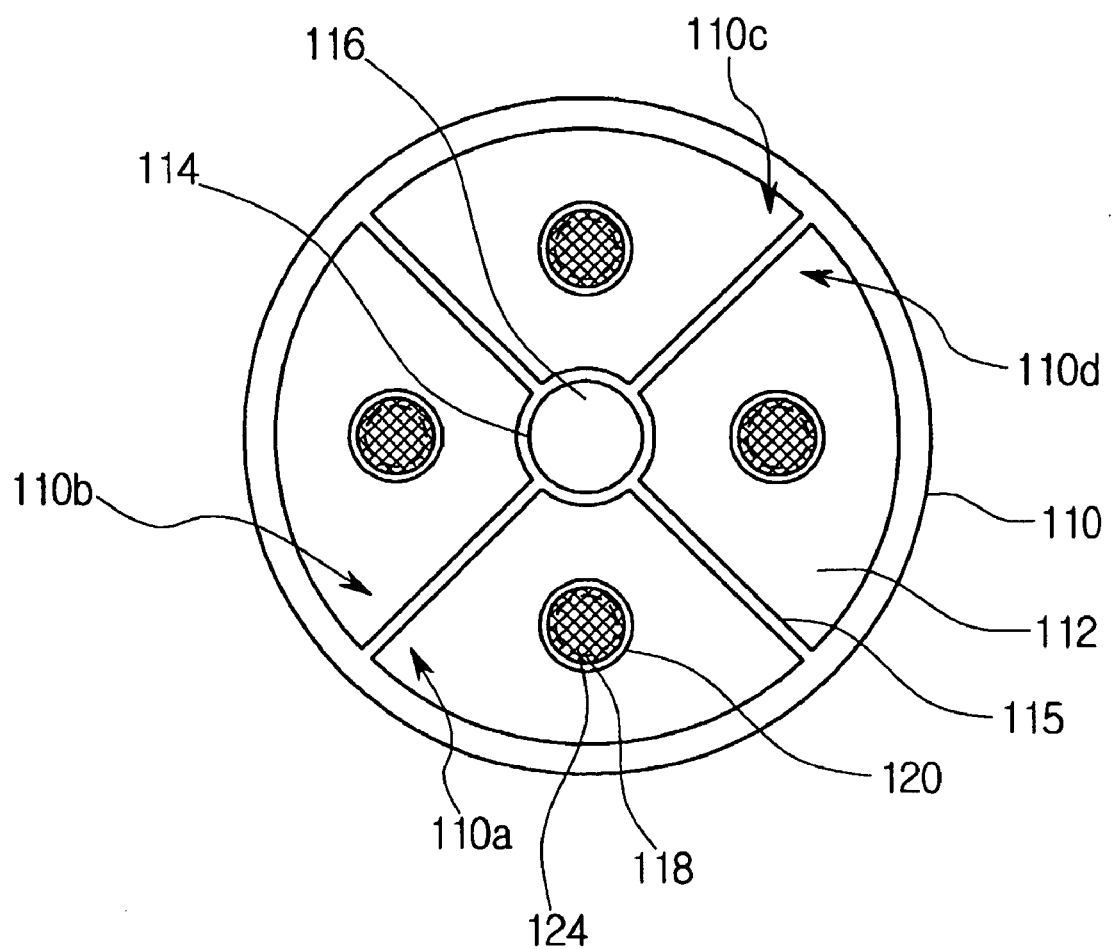
FIG. 3 is a sectional view of the water softener taken along the III-III line of FIG. 2.

On the other hand, the water softening tank 110 has an internal region partitioned into a plurality of water softening regions, which contains the ion exchange resin 112. Referring to FIG. 2 and FIG. 3 which is a sectional view of the water softener 100 taken along the III-III line of FIG. 2, the water softening tank 110 will be described in more detail, as follows.

As shown in FIGS. 2 and 3, the water softening tank 110 of the water softener 100 according to the present invention has a cylindrical shape or a polygonal tubular shape, a raw water feed pipe 114 placed in a longitudinal direction and at a center of the water softening tank, and a plurality of partitions 115 placed in radial directions around the raw water feed pipe 114, which partition the internal region of the water softening tank 110 into a plurality of water softening regions 110a, 110b, 110c and 110d.

A water inlet hole 116 is formed on a bottom of the water softening tank 110 to extend the raw water feed pipe 114 to the exterior and supply the raw water into the water softening tank. A plurality of water discharge holes 118 are formed on the bottom of the water softening tank to allow for a communication of the plurality of water softening regions 110a, 110b, 110c and 110d with the exterior and to discharge the soft water and the waste regeneration water to the exterior. Preferably, a check valve 120 may be provided at each of the plurality of water discharge holes 118 to allow a fluid to flow in only one direction.

The regeneration tank 130 integrated with an upper part of the water softening tank 110 into a single body also has a similar cylindrical or polygonal tubular shape to the water softening tank 110. The regeneration tank 130 is equipped with an inlet hole 134 with a stopper at an upper end thereof, through which the regeneration material such as salts is added thereto. Also, a communication hole 136 is provided on a center of a bottom of the regeneration tank 130 to allow the regeneration tank 130 to communicate with the water softening tank. Preferably, a guide plate 138 is provided on the bottom of the regeneration tank 130 at a state of being inclined toward a central communication hole 136 to effectively supply the regeneration water from the regeneration tank 130 to the water softening tank 110 via the communication hole 136.

In the regeneration tank 130 and the water softening tank 110, which are integrated with each other into a single body vertically, a cold/hot control valve 140 is provided, which is coupled to an upper part of the raw water feed pipe 114 to supply the raw water from the raw water feed pipe to a selected one of the plurality of water softening regions 110a, 110b, 110c and 110d during the soft water producing process; and a regeneration valve 160 is provided, which is coupled to the raw water feed pipe 114 through the cold/hot control valve 140 and penetrates an upper surface of the regeneration tank 130, and, upon regeneration of the ion exchange resin, introducing the raw water from the raw water feed pipe 114 into the regeneration tank 130 by the manual control of a user to produce the regeneration water, and then supplying the regeneration water to a selected one of the plurality of water softening regions 110a, 110b, 110c and 110d by the cold/hot control valve 140.

Figure 4:
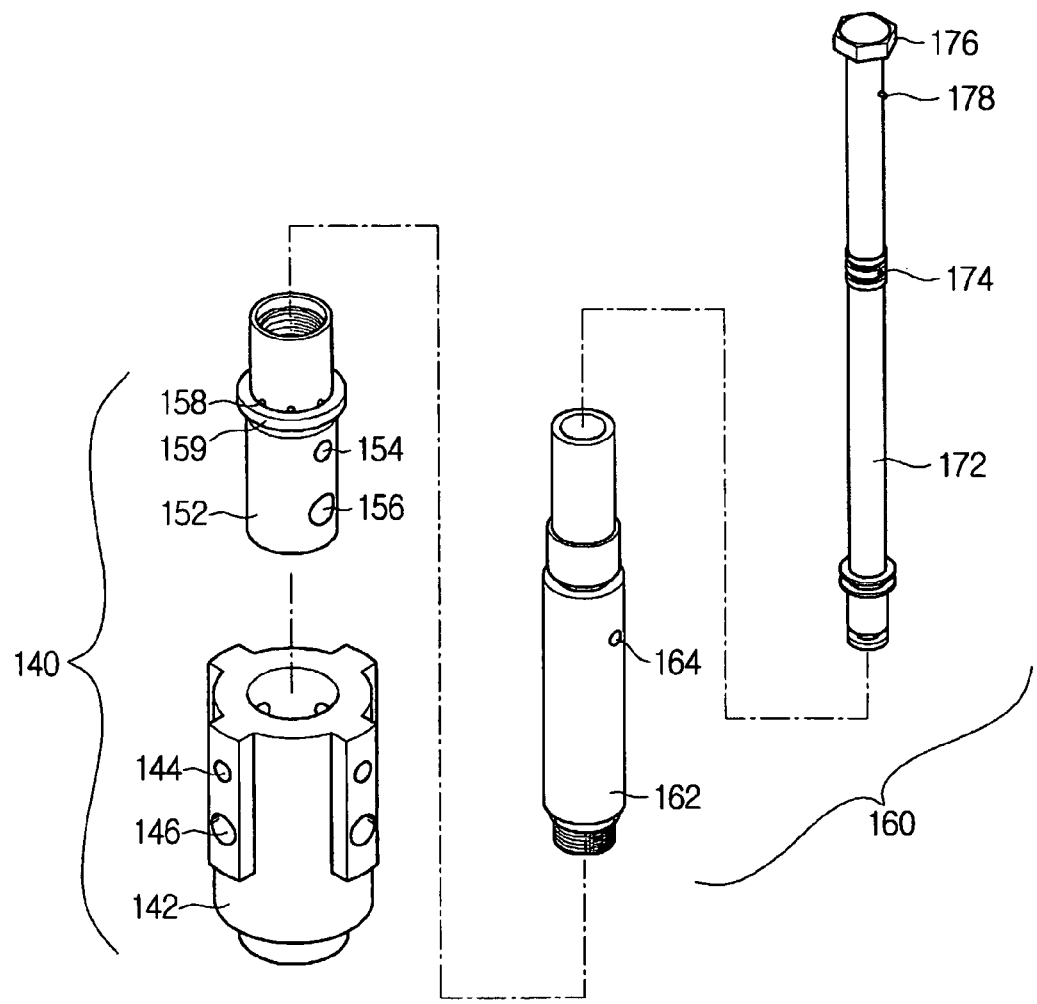
FIG. 4 is an exploded perspective view of a cold/hot control valve and a regeneration valve according to the present invention.

The cold/hot control valve 140 and the regeneration valve 160 will be described in detail, below, referring to FIG. 4, which is an exploded perspective view of the cold/hot control valve 140 and the regeneration valve 160 installed in the water softener 100 according to the present invention, and FIG. 2.

As shown in the drawings, the cold/hot control valve 140 is provided on the upper part of the raw water feed pipe 114 to extend the raw water feed pipe 114 and a portion thereof is inserted into the regeneration tank 130 by the communication hole 136. The cold/hot control valve 140 includes a control valve housing 142 having a pipe shape to substantially widen the diameter of the upper part of the raw water feed pipe 114 of the water softening tank 110, and a rotatory body 152 having a pipe shape of which a lower part is inserted into the control valve housing 142 and an upper part is inserted into the regeneration tank 130 via the communication hole 136.

The control valve housing 142 includes a plurality of vertical pairs of holes each including a regeneration water hole 144 and a raw water hole 146 that are formed through an outer surface of the control valve housing 142 to communicate the raw water feed pipe 114 with each of the plurality of water softening regions 110a, 110b, 110c and 110d of the water softening tank 110. The rotatory body 152 includes both a regeneration water guide hole 154 and a raw water guide hole 156 formed through an outer surface of the lower part of the rotatory body to communicate respectively with the regeneration water hole 144 and the raw water hole 146 of a selected pair of the holes, and a plurality of regeneration water supply holes 158 formed around an outer surface of the upper part of the rotary body near a bottom of the regeneration tank 130.

Preferably, a ring-shaped locking unit 159 is formed around the outer surface of the rotatory body 152 to close the communication hole 136 of the regeneration tank 130 at the lower end thereof and simultaneously limit the degree of insertion of the rotatory body into the control valve housing 142, between the regeneration water supply holes 158 and the regeneration water guide hole 154.

Therefore, the raw water supplied by the raw water feed pipe 114 is supplied to a selected one of the plurality of water softening regions 110a, 110b, 110c and 110d by the rotation of the rotatory body 152, and simultaneously introduced into the regeneration tank 130 at the upper part of the water softening tank 110 by the control valve housing 142 and the rotatory body 152.

The regeneration valve 160 coupled to the cold/hot control valve 140 includes a tube housing 162 having a tubular shape to penetrate upper and lower parts of the regeneration tank 130 and be coupled to an upper end of the rotary body 152 to extend the raw water feed pipe 114, and a stem shaft 172 having a tubular shape with a closed upper end, and inserted into both the tube housing 162 and the rotatory body 152 to be manually moved upward and downward by a user.

A regeneration raw water hole 164 is formed through an outer surface of the tube housing placed in the regeneration tank 130, and a regeneration raw water guide hole 174 is formed through an outer surface of the stem shaft 172. Thus, when moving upward, the stem shaft 172 closes the regeneration raw water hole 164 of the tube housing 162 at an outer surface thereof, and opens the raw water guide hole 156 and simultaneously closes the regeneration water guide hole 154 at a lower end thereof. When moving downward, the stem shaft 172 communicates the regeneration raw water guide hole 174 placed in the outer surface thereof with the regeneration raw water hole 164 of the tube housing 162 and the regeneration water supply hole 158 with the regeneration water guide hole 154 through an internal region of the rotatory body 152, and simultaneously closes the raw water guide hole 156 at the lower end thereof.

Therefore, during a soft water producing process, the stem shaft 172 of the regeneration valve 160 moves upward to introduce the raw water from the raw water feed pipe 114 into a selected one of the plurality of water softening regions 110a, 110b, 110c and 110d via the raw water guide hole 156 of the rotatory body 152 or the raw water hole 146 of the control valve housing 142. During a regeneration process, the stem shaft 172 moves downward to introduce the raw water from the raw water feed pipe 114 into the regeneration tank 130 via the regeneration raw water guide hole 174 of the stem shaft 172. The regeneration water produced in the regeneration tank 130 is introduced into the rotatory body 152 via the regeneration water supply hole 158 thereof, and then discharged to a selected one of the water softening regions 110a, 110b, 110c and 110d via the regeneration water guide hole 154.

The cold/hot control valve 140 and the regeneration valve 160 will be described in more detail below, referring to FIGS. 5 and 6, which are magnified vertical sectional views of the water softener according to the present invention, which undergoes a soft water producing process and a regeneration process, respectively.

Figure 5:
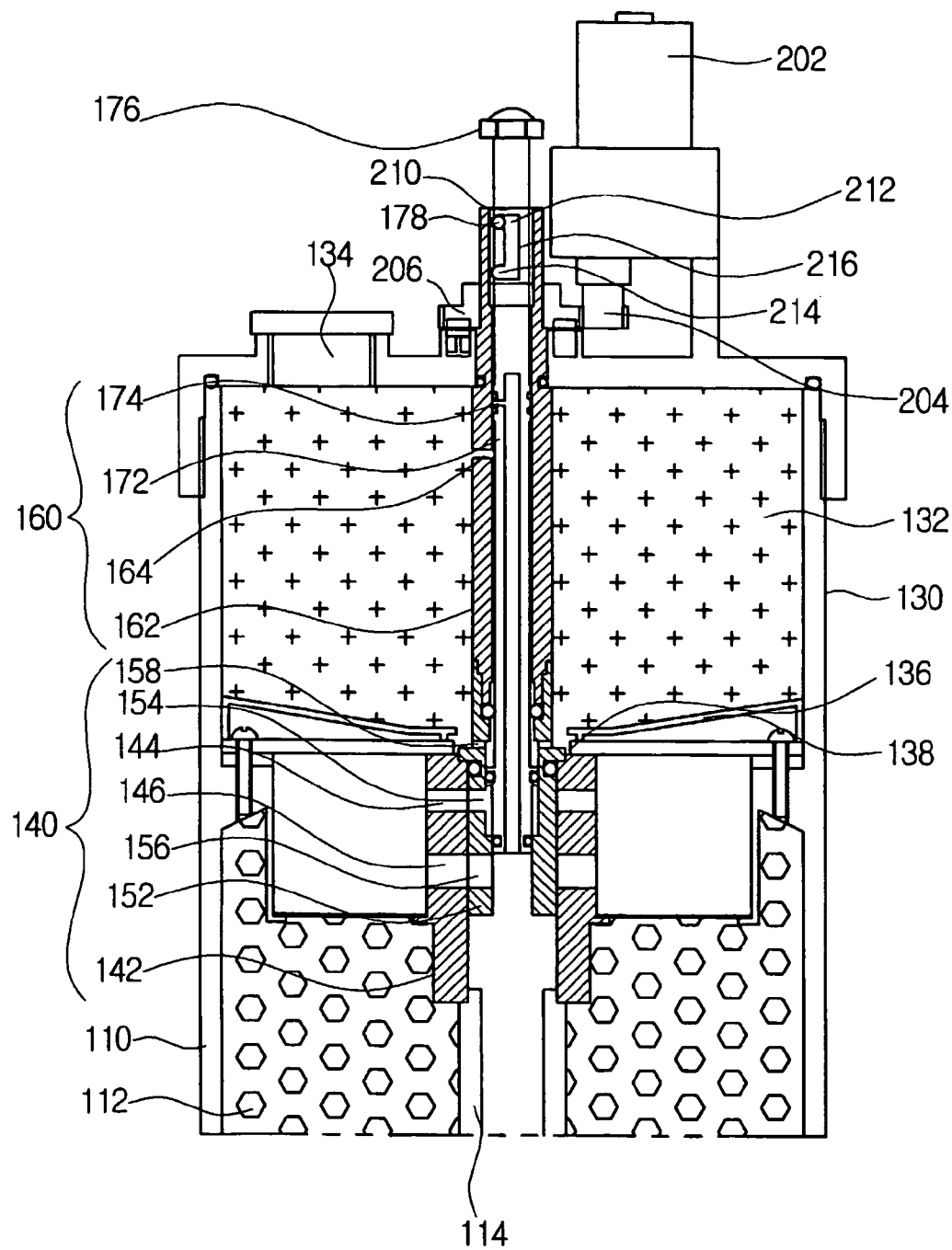
FIGS. 5 and 6 are magnified sectional views of the water softener according to the present invention, which undergo a soft water producing process and a regeneration process, respectively.

During a soft water producing process, as shown in FIG. 5, first, the regeneration water guide hole 154 and the raw water guide hole 156 are communicated respectively with the regeneration water hole 154 and the raw water hole 146 of a selected vertical pair of holes of the control valve housing 142 by the rotation of the rotatory body 152. Subsequently, the stem shaft 172 of the regeneration valve 160 moves upward to close the regeneration raw water hole 164 of the tube housing 162 at the outer surface thereof, and, at the lower end thereof, to open the raw water guide hole 156 of the rotatory body 152 and simultaneously close the regeneration water guide hole 154. Thus, the raw water is supplied from the raw water feed pipe 114 to a corresponding one of the water softening regions 110a, 110b, 110c and 110d via the raw water guide hole 156 of the rotatory body 152 and the raw water hole 146 of the control valve housing 142, softened by passing through the ion exchange resin 112, and discharged via a corresponding one of water discharge holes 118 individually formed on the bottom of each of the water softening regions 110a, 110b, 110c and 110d.

Figure 6:
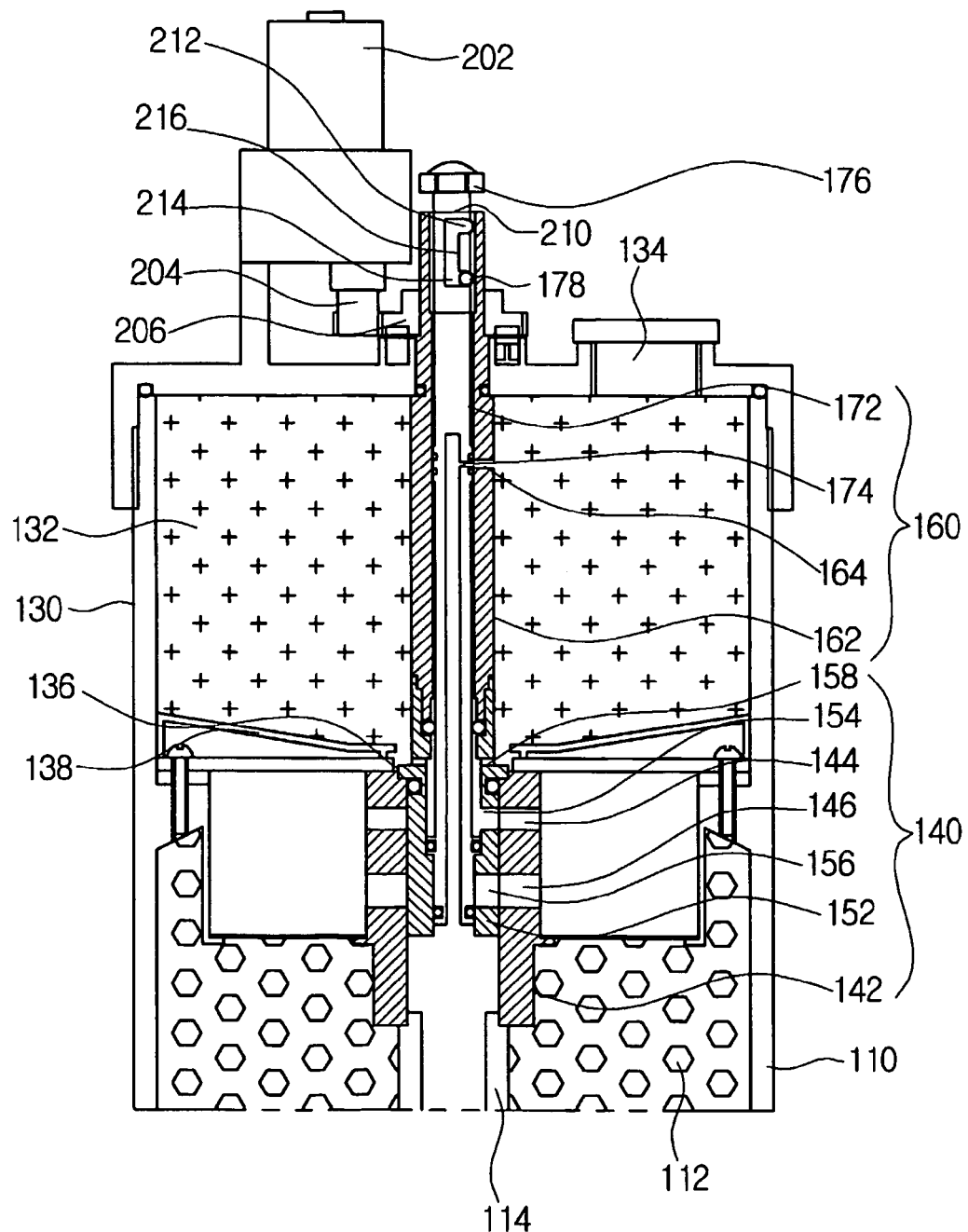

During a regeneration process, as shown in FIG. 6, the regeneration water guide hole 154 and the raw water guide hole 156 are communicated respectively with the regeneration water hole 144 and the raw water hole 146 of a selected vertical pair of holes of the control valve housing 142 by the rotation of the rotatory body 152. Subsequently, the stem shaft 172 of the regeneration valve 160 moves downward to communicate the regeneration raw water guide hole 174 placed in the outer surface thereof with the regeneration raw water hole 164 of the tube housing 162 and the regeneration water supply hole 158 with the regeneration water guide hole 154 through the internal region of the rotatory body 152, and simultaneously close the raw water guide hole 156 at the lower end thereof.

Therefore, the raw water supplied to the cold/hot control valve 142 via the raw water feed pipe 114 flows upward along the stem shaft 172 of the regeneration valve 160, and is then supplied to the regeneration tank 130 through the regeneration raw water guide hole 174 and the regeneration raw water hole 164 of the tube housing 162. In the regeneration tank 130, the raw water dissolves the regeneration material 132, thereby producing regeneration water. The regeneration water is introduced into the raw water feed pipe 114 through the regeneration water supply hole 158 of the rotatory body 152, and supplied to a selected one of the water softening regions 110a, 110b, 110c and 110d via the regeneration raw water guide hole 154 and the regeneration water hole 144 of the control valve housing 142. The regeneration water regenerates the ion exchange resin 112, and resulting waste regeneration water is discharged via a corresponding one of the water discharge holes 118.

Preferably, to prevent a loss of the ion exchange resin 112 by water flow, each of the water softening regions 110a, 110b, 110c and 110d of the water softening tank 110 includes a plurality of first metal meshes 122 which individually surround the regeneration water hole 144 and the raw water hole 146 as the plurality of vertical pairs formed along the outer surface of the control valve housing 142, and a plurality of second metal meshes 124 which cover each of the water discharge holes 118 in the inside of each of the water softening regions.

On the other hand, the water softener 100 according to the present invention is characterized in that the cold/hot control valve 140 and the rotatory body 152 is automatically controlled according to the temperature of the raw water. For this automatic control, the water softener 100 further includes a temperature sensor 190 provided at the water inlet tube 182 of the base frame 180, an operation control unit 200 is provided at the upper end of the regeneration tank 130 to control the cold/hot control valve 140, and a logic operation unit, not illustrated, to finely control the operation control unit 200 according to a sensing result of the temperature sensor 190.

The operation control unit 200 includes a motor 202 having a rotatory axis 204 and an operation gear 206 being in gear with the rotatory axis 204 and fixed surround an outer surface of the upper end of the tube housing 162. The logic operation unit finely controls a rotational direction and a rotational angle of the motor 202 according to the sensing result of the temperature sensor 190, thus allowing the raw water to be supplied to a corresponding one of the water softening regions 110a, 110b, 110c and 110d, individually assigned to a particular temperature.

In this way, heat loss is minimized, which is caused by a difference in the temperature between the raw water and the ion exchange resin 112 or the water softening regions 110a, 110b, 110c and 110d, thereby rapidly supplying soft water at a desired temperature to a user within a wider range of temperature.

The stem shaft 172 has an upper part exposed to an outside of an upper end of the tube housing 162 placed in an outside of the regeneration tank 130, and includes a knob 176 at an upper end thereof to facilitate a manual operation thereof by a user. In addition, a locking protrusion 178 is provided on the outer surface of the upper end of the stem shaft 172 to maintain the operation of the regeneration valve 160. To surround the locking protrusion 178 and the stem shaft 172, a first locking groove 212 and a second locking groove 214 are respectively provided on an upper part and a lower part of an outer surface of the tube housing 162. Further, a ring-shaped control unit 210 is coupled to the upper end of the tube housing 162 while surrounding both the locking protrusion 178 and the stem shaft 172, which includes a first locking groove 212 and a second locking groove 214 respectively provided on an upper part and a lower part of an outer surface of the ring-shaped control unit, and a connection groove 216 to connect corresponding ends of the first and second locking grooves to each other. The first locking groove 212 limits the uppermost position of the stem shaft 172 during the soft water producing process. The second locking groove 214 limits the lowermost position of the stem shaft 172 during the regeneration process.

Therefore, during the soft water producing process or the regeneration process, a user may fix the stem shaft 172 at the corresponding height.

On the other hand, the aforementioned base frame 180 serves as a support to settle and fix the plurality of water softening tanks 110, and is a site through which the raw water is supplied to a selected one of the water softening tanks 110 and the soft water or waste regeneration water from each of the water softening tanks 110 is discharged to the exterior. The base frame 180 defines an internal water discharge region 184 to which the plurality of water discharge holes 118 of the water softening tanks 110 join together, and is equipped with a water inlet tube 182 coupled to the water inlet hole 116 of the water softening tank 110 by a raw water control valve 188, and a water discharge tube 186 to extend the water discharge region 184 to an exterior to discharge the soft water and the waste regeneration water.

The raw water control valve 188 is manually operable by a user. Preferably, the base frame 180 includes a preprocessing filter 192 to be placed between the water inlet tube 182 and each of the plurality of water inlet holes 116 of the water softening tank 110, thus removing impurities from the raw water. The reference numeral 194 in the drawings denotes a filter cover to allow the preprocessing filter 192 installed in the base frame 180 to be exchanged with a new one.

INDUSTRIAL APPLICABILITY

As described hereinbefore, the water softener according to the present invention is capable of being manufactured in a small size and producing soft water at various temperatures by separately softening raw water at various temperatures and then discharging the soft water to the exterior by interaction of a temperature sensor formed at a water inlet tube with raw water control and cold/hot control valves that operate with the temperature sensor in an interlocking manner. Therefore, the water softener of the present invention has an advantage of supplying soft water closed to a desired temperature to a user.

In addition, the water softener of the present invention has another advantage of simply and easily performing the periodic resin regeneration by employing the regeneration valve and, thus, of being more convenient in use.

The invention claimed is:

1. A water softener to produce soft water at various temperatures and facilitate regeneration of an ion exchange resin (112) thereof by causing raw water to pass through the ion exchange resin (112) to produce soft water during a soft water producing process and causing a regeneration material (132) to be dissolved in the raw water to generate regeneration water that then flows through the ion exchange resin (112) to regenerate the ion exchange resin, and is, thereafter, discharged as resulting waste regeneration water during a regeneration process, wherein the water softener (100) comprises:

a water softening tank (110) in which an internal region containing therein the ion exchange resin (112) is partitioned into a plurality of water softening regions (110a, 110b, 110c and 110d), which are individually assigned into a predetermined temperature, with a raw water feed pipe (114) placed in a longitudinal direction of the water softening tank, a plurality of partitions (115) placed in radial directions around the raw water feed pipe (114), a water inlet hole (116) formed on a bottom of the water softening tank to extend the raw water feed pipe (114) to the exterior and supply the raw water into the water softening tank, and a plurality of water discharge holes (118) formed on the bottom of the water softening tank to allow for a communication of the plurality of water softening regions with the exterior and to discharge the soft water and the waste regeneration water to the exterior;

a regeneration tank (130) coupled to an upper part of the water softening tank (110) and containing therein the regeneration material (132);

a cold/hot control valve (140) provided on an upper part of the raw water feed pipe (114) in a form of being inserted into the regeneration tank (130) to supply the raw water to a selected one of the plurality of water softening regions (110a, 110b, 110c and 110d) during the soft water producing process;

a regeneration valve (160) penetrating an upper surface of the regeneration tank (130) and coupled to the raw water feed pipe (114) through the cold/hot control valve (140), and, upon regeneration of the ion exchange resin, introducing the raw water into the regeneration tank (130) by manual control to produce the regeneration water and then supplying the regeneration water to a selected one of the plurality of water softening regions (110a, 110b, 110c and 110d);

a temperature sensor (190) to sense a temperature of the raw water supplied through the water inlet hole (116); and an operation control unit (200) to control the cold/hot control valve (140) to supply the raw water to one of the plurality of water softening regions (110a, 110b, 110c and 110d) according to the temperature of the raw water sensed by the temperature sensor (190).

2. The water softener to produce the soft water at various temperatures and facilitate the regeneration of the ion exchange resin according to claim 1, wherein the cold/hot control valve (140) comprises:

a control valve housing (142) having a pipe shape to substantially widen the upper part of the raw water feed pipe (114) of the water softening tank (110), and comprising a plurality of vertical pairs of holes each including a regeneration water hole (144) and a raw water hole (146) that are formed through an outer surface of the control valve housing to communicate the raw water feed pipe (114) with each of the plurality of water softening regions (110a, 110b, 110c and 110d); and a rotatory body (152) having a pipe shape of which a lower part is inserted into the control valve housing (142) and an upper part is inserted into the regeneration tank (130), with both a regeneration water guide hole (154) and a raw water guide hole (156) formed through an outer surface of the lower part of the rotatory body to communicate respectively with the regeneration water hole (144) and the raw water hole (146) of a selected pair of holes by a rotation of the rotatory body (152), and a plurality of regeneration water supply holes (158) formed around an outer surface of the upper part of the rotary body near a bottom of the regeneration tank (130), wherein, the regeneration valve (160) comprises:

a tube housing (162) having a tubular shape to be coupled to the rotary body (152), with a regeneration raw water hole (164) formed through an outer surface of the tube housing placed in the regeneration tank (130); and a stem shaft (172) having a tubular shape with a closed-upper end, and inserted into both the tube housing (162) and the rotatory body (152) to move upward and downward, with a regeneration raw water guide hole (174) formed through an outer surface of the stem shaft, the stem shaft thus closing the regeneration water guide hole (154) and simultaneously opening the raw water guide hole (156) at a lower end thereof when moving upward, and, when moving downward, the stem shaft communicating the regeneration raw water guide hole (174) with the regeneration raw water hole (164), and simultaneously communicating the regeneration water supply hole (158) with the regeneration water guide hole (154) through an internal region of the rotatory body (152), and closing the raw water guide hole (156) at the lower end thereof.

3. The water softener to produce the soft water at various temperatures and facilitate the regeneration of the ion exchange resin according to claim 2, wherein the operation control unit (200) comprises:

a motor (202) to rotate an upper part of the tube housing (162) exposed to an outside of the upper part of the regeneration tank (130) to rotate the rotatory body (152): and a logic operation unit to determine a rotational direction and a rotational angle of the motor (202) according to a sensing result of the temperature sensor (190).

4. The water softener to produce the soft water at various temperatures and facilitate the regeneration of the ion exchange resin according to claim 3, further comprising:

a locking protrusion (178) provided on the outer surface of the stem shaft (172) exposed to an outside of an upper end of the tube housing (162); and a ring-shaped control unit (210) coupled to the upper end of the tube housing (162) while surrounding both the locking protrusion (178) and the stem shaft (172), with a first locking groove (212) and a second locking groove (214) respectively provided on an upper part and a lower part of an outer surface of the ring-shaped control unit to limit uppermost and lowermost positions of the stem shaft (172), and a connection groove (216) to connect corresponding ends of the first and second locking grooves to each other, thus allowing a user to manually move vertically and lock the upper end of the stem shaft (172).

5. The water softener to produce the soft water at various temperatures and facilitate the regeneration of the ion exchange resin according to claim 1, wherein the regeneration tank (110) and the water softening tank (130) coupled to each other in a vertical direction individually comprise a plurality of tanks arranged side by side, and further comprising:

a base frame (180) to surround lower ends of the plurality of water softening tanks (130) defining an internal water discharge region (184) to which the plurality of water discharge holes (118) of the water softening tanks (130) join together, with a water inlet tube (182) to supply the external raw water to the lower frame and a water discharge tube (186) to extend the water discharge region (184) to an exterior;

a raw water control valve (188) provided on the base frame (180) and manually controlled by a user to supply the raw water from the water inflow tube (182) to a selected one of the water inlet holes (116) of the plurality of water softening tanks (130); and a preprocessing filter (192) installed in the base frame (180) to be placed between each of the plurality of water inlet holes (118) and the water inlet tube (182), thus removing impurities from the raw water.

* * * * *